United States Patent
Choi

(10) Patent No.: US 10,838,546 B2
(45) Date of Patent: Nov. 17, 2020

(54) TOUCH DRIVING DEVICE AND DISPLAY DEVICE

(71) Applicant: SILICON WORKS CO., LTD., Daejeon (KR)

(72) Inventor: Jung Min Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/513,070

(22) Filed: Jul. 16, 2019

(65) Prior Publication Data

US 2020/0026406 A1 Jan. 23, 2020

(30) Foreign Application Priority Data

Jul. 19, 2018 (KR) .................. 10-2018-0083854

(51) Int. Cl.
  *G06F 3/041* (2006.01)
  *G06F 3/044* (2006.01)
  *G09G 3/20* (2006.01)
  *G02F 1/1333* (2006.01)

(52) U.S. Cl.
  CPC ...... *G06F 3/04162* (2019.05); *G02F 1/13338* (2013.01); *G06F 3/044* (2013.01); *G06F 3/0412* (2013.01); *G09G 3/2092* (2013.01); *G09G 2300/0426* (2013.01)

(58) Field of Classification Search
  CPC combination set(s) only.
  See application file for complete search history.

(56) References Cited

U.S. PATENT DOCUMENTS

| | | | |
|---|---|---|---|
| 9,880,649 B2 | 1/2018 | Agarwal et al. | |
| 2017/0285771 A1 | 10/2017 | Jung et al. | |
| 2018/0024654 A1* | 1/2018 | Koike | G09G 3/20 345/174 |
| 2018/0145807 A1 | 5/2018 | Nagata et al. | |
| 2018/0188836 A1 | 7/2018 | Park | |
| 2019/0146602 A1* | 5/2019 | Kadowaki | G06F 3/04162 345/174 |
| 2019/0171320 A1* | 6/2019 | Kim | G06F 3/0442 |
| 2020/0026369 A1* | 1/2020 | Hisano | G06F 3/0442 |
| 2020/0050339 A1* | 2/2020 | Choi | G06F 3/0383 |

FOREIGN PATENT DOCUMENTS

| | | |
|---|---|---|
| JP | 5925279 B2 | 4/2016 |
| KR | 10-2016-0031135 A | 3/2016 |
| KR | 10-2017-0081127 A | 7/2017 |
| KR | 10-2018-0046338 A | 5/2018 |
| KR | 10-2018-0079586 A | 7/2018 |
| KR | 10-2019-0038130 A | 4/2019 |

OTHER PUBLICATIONS

United States Office Action, U.S. Appl. No. 16/533,054, dated Aug. 14, 2020, 13 pages.

* cited by examiner

*Primary Examiner* — Ryan A Lubit
(74) *Attorney, Agent, or Firm* — Fenwick & West LLP

(57) ABSTRACT

A display device is configured to float a display electrode coupled to a touch sensor by parasitic capacitance when an uplink signal is transmitted to a touch pen through the touch sensor.

7 Claims, 12 Drawing Sheets

TOUCH DRIVING DEVICE AND DISPLAY DEVICE

CROSS REFERENCE TO RELATED APPLICATION

This application claims priority from Republic of Korea Patent Application No. 10-2018-0083854, filed on Jul. 19, 2018, which is hereby incorporated by reference in its entirety.

BACKGROUND

1. Field of Technology

The present embodiment relates to a technology for driving a touch sensor, and a display device.

2. Description of the Prior Art

As display panels become thinner, parasitic capacitance between a touch sensor and display electrodes (for example, a data line, a gate line, a common electrode, a cathode electrode, etc.) has also gradually increased.

In a display device which transmits an uplink signal to an active pen, which is a kind of a touch pen, through a touch sensor, the waveform of the uplink signal is not normally formed due to the above-mentioned parasitic capacitance.

Further, the parasitic capacitance increases a RC time constant of a touch sensor. Due to the increase in the RC time constant, a voltage level of the uplink signal does not rise to a predetermined voltage level within a predetermined driving time.

In order to solve the above problems, a method for increasing the driving voltage of an uplink signal has been suggested. However, since the increase in the driving voltage causes an increase in power consumption, the method is not preferred.

SUMMARY

In this background, an aspect of the present embodiment is to provide technology for improving the characteristics of an uplink signal transmitted to an active pen.

In accordance with the aspect of the present disclosure, one embodiment thereof provides a touch-driving device configured to transmit an uplink signal to an active pen and receive a downlink signal from the active pen, the touch-driving device including: an uplink controlling unit configured to transmit the uplink signal through a touch sensor while floating a display electrode, which forms parasitic capacitance with the touch sensor therebetween, in a first time interval; and a downlink controlling unit configured to receive the downlink signal through the touch sensor in a second time interval that does not overlap the first time interval.

In the touch-driving device, a display-driving voltage may be supplied to the display electrode in the second time interval.

In the touch-driving device, the first time interval may be included in a time interval in which a display is not updated according to a vertical synchronization signal or a horizontal synchronization signal.

In the touch-driving device, the touch sensor may be a common electrode supplied with a common voltage in a liquid crystal display (LCD) panel, and the display electrode may be, in the LCD panel, a data line supplied with a data voltage or a gate line supplied with a scan signal.

In the touch-driving device, the touch sensor may be a cathode electrode of an organic light-emitting diode (OLED) panel, and the display electrode may be a driving voltage line configured to supply a driving voltage to an OLED disposed in each pixel of the OLED panel.

In the touch-driving device, the uplink signal may include display panel information or a synchronization signal, and the downlink signal may include state information of the active pen.

Another embodiment provides a display device including: a display electrode layer on which display electrodes are disposed; a touch sensor layer on which touch sensors are disposed; a display-driving device configured to supply a display-driving voltage to the display electrode; and a touch-driving device configured to transmit an uplink signal to an active pen and receive a downlink signal from the active pen, through the touch sensor, wherein parasitic capacitance is formed between the display electrode and the touch sensor, and the display electrode is floated when the touch-driving device transmits the uplink signal.

In the display device, the display electrode may be a common electrode, and a liquid crystal layer or a color filter layer may be interposed between the display electrodes and the touch sensors.

In the display device, the common electrode may be connected to a common voltage supply device configured to supply a common voltage, and when the uplink signal is transmitted, the common voltage supply device may block the common voltage to thus float the common electrode.

In the display device, the display electrode may be a cathode electrode of an organic light-emitting diode (OLED), and an insulation film may be interposed between the display electrodes and the touch sensors.

In the display device, the cathode electrode may be connected to a base voltage supply device configured to supply a base voltage, and when the uplink signal is transmitted, the base voltage supply device may block the base voltage to thus float the cathode electrode.

In the display device, when the uplink signal is transmitted, a driving voltage supply device configured to supply a driving voltage to an anode electrode of the OLED through a driving voltage line may block the driving voltage to thus float the driving voltage line.

In the display device, at least one of a common electrode, a data line, and a gate line, as the display electrode, may be floated in a predetermined time interval in which a display is not updated.

Another embodiment provides a display device including: a display electrode layer on which display electrodes are disposed; a touch sensor layer on which touch sensors are disposed; a display-driving device configured to supply a display-driving voltage to the display electrode; and a touch-driving device configured to transmit an uplink signal to an active pen and receive a downlink signal from the active pen, through the touch sensor, wherein parasitic capacitance is formed between the display electrode and the touch sensor, and when the touch-driving device transmits the uplink signal, the display electrode is supplied with a modulation signal identical in phase to the uplink signal.

In the display device, the display electrode may be a common electrode supplied with a common voltage in a liquid crystal display (LCD) panel or a cathode electrode of an organic light-emitting diode (OLED) panel, and when the uplink signal is transmitted, a data line or gate line of the LCD panel or the OLED panel may be floated.

In the display device, the modulation signal may have a waveform of a sine wave or a triangular wave.

As described above, according to the present embodiment, a signal characteristic of an uplink signal transmitted to an active pen may be improved without increasing power consumption.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
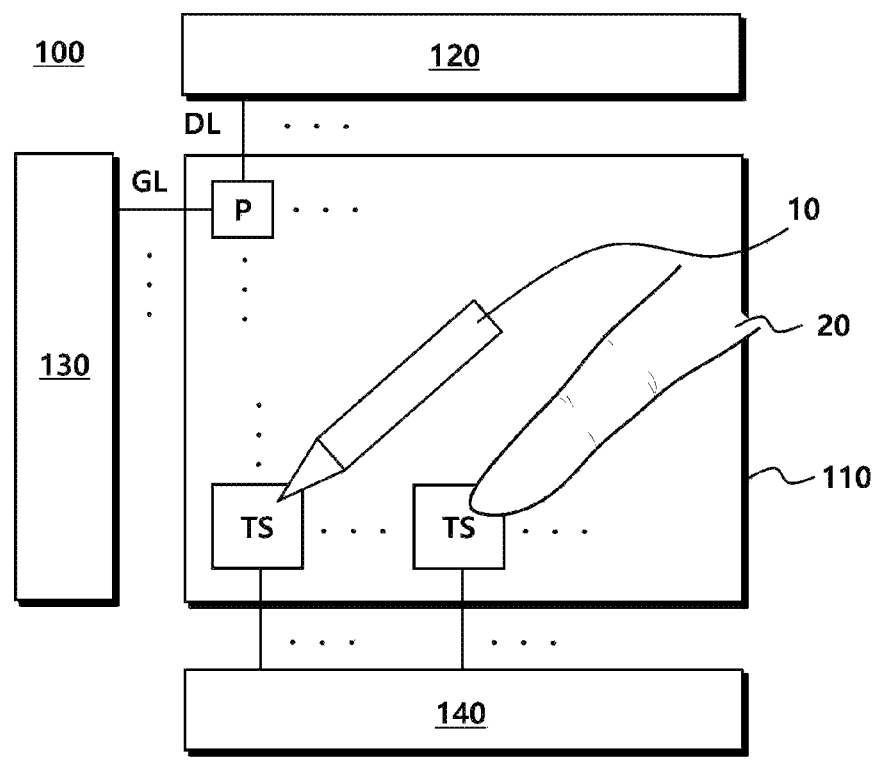
FIG. 1 illustrates the configuration of a display device according to one embodiment.

Hereinafter, embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected," "coupled," and "joined" between the first and second components.

FIG. 1 illustrates the configuration of a display device according to one embodiment.

Referring to FIG. 1, a display device 100 may include a panel 110, a data-driving device 120, a gate-driving device 130, and a touch-driving device 140.

Each of the data-driving device 120, the gate-driving device 130, and the touch-driving device 140 may drive at least one element included in the panel 110.

The data-driving device 120 may drive a data line (DL) connected to a pixel (P), and the gate-driving device 130 may drive a gate line (GL) connected to a pixel (P). The touch-driving device 140 may drive a touch sensor (TS) disposed in the panel 110.

The data-driving device 120 may supply a data voltage to the data line (DL) in order to display an image on each pixel (P) of the panel 110. The data-driving device 120 may include at least one data driver integrated circuit, wherein the at least one data driver integrated circuit may be connected to a bonding pad of the panel 110 in a Tape-Automated-Bonding (TAB) manner or in a Chip-On-Glass (COG) manner, may be formed directly in the panel 110, or may be formed to be integrated with the panel 110 in some cases. Further, the data-driving device 120 may be implemented in a Chip On Film (COF) manner.

The gate-driving device 130 may supply a scan signal to the gate line (GL) in order to turn on/off a transistor positioned in each pixel (P). Depending on the driving manner, the gate-driving device 130 may be positioned only at one side of the panel 110 as in FIG. 1 or may be positioned at each of both sides of the panel 110. The gate-driving device 130 may include at least one gate driver integrated circuit, wherein the at least one gate driver integrated circuit may be connected to a bonding pad of the panel 110 in the TAB manner or in the COG manner, may be implemented in a Gate-In-Panel (GIP) type and directly formed in the panel 110, or may be integrated and formed to be integrated with the panel 110 in some cases. Further, the gate-driving device 130 may be implemented in a COF manner.

An electrode supplied with a voltage for driving a display panel may be referred to as a display electrode. The display electrode may be, for example, a data line (DL), a gate line (GL), a driving voltage line, a common electrode supplied with a common voltage in a liquid crystal display (LCD) panel, an anode electrode/cathode electrode of an organic light-emitting Diode (OLED) in an OLED panel, etc. A device for driving the display electrode may be referred to as a display-driving device.

The display electrode may be supplied with a display-driving voltage. For example, a data voltage may be supplied to the data line (DL). A scan signal may be supplied to the gate line (GL). A pixel-driving voltage (VDD) may be supplied to the driving voltage line, a common voltage may be supplied to the common electrode, the pixel-driving voltage (VDD) may be supplied to the anode electrode of the OLED, and a base voltage (VSS) may be supplied to the cathode electrode of the OLED. The data voltage may be supplied by the data-driving device 120, and the scan signal may be supplied by the gate-driving device 130. The common voltage may be supplied by a common voltage supply device. The pixel-driving voltage (VDD) may be supplied by a driving voltage supply device, and the base voltage (VSS) may be supplied by a base voltage supply device. The common voltage supply device, the driving voltage supply device, and the base voltage supply device may be implemented as one device, or may be implemented as different devices.

The panel 110 may include only a display panel and may further include a touch screen panel (TSP). The display panel and the touch screen panel may share some constituent elements. For example, a touch sensor (TS) for sensing a touch in the touch screen panel may be used as a common electrode supplied with a common voltage in the display panel—in the case where the display panel is an LCD panel. As another example, the touch sensor (TS) may be used as a cathode electrode supplied with a base voltage (VSS) in the display panel—in the case in which the display panel is an OLED panel. The display panel and the touch panel share some constituent elements and thus the panel (110) may be referral to as an integrated panel. However, the present disclosure is not disclosed thereto. Further, an in-cell-type panel in which the display panel and the touch panel are integrally coupled to each other is known, but is only an example of the above-mentioned panel 110. The panel to which the present disclosure is applied is not limited to such an in-cell-type panel.

Multiple touch sensors (TSs) may be arranged in the panel 110 and the touch-driving device 140 may drive the touch sensor (TSs) by using driving signals. The touch-driving device 140 may generate sensing values for the touch sensors (TSs) according to reaction signals formed in the touch sensors (TSs) in response to the driving signals. The touch-driving device 140 may calculate the touch coordinates of an object 20 by using the sensing values for the multiple touch sensors (TSs) arranged in the panel 110, and the calculated touch coordinates may be transmitted to and used by another device—for example, a host.

The touch-driving device 140 may transmit and receive a signal to and from an active pen 10 through each of the touch sensors (TSs). The touch-driving device 140 may supply an uplink signal to the touch sensor (TS), and the active pen 10 may receive the uplink signal through a contact with the touch sensor (TS). The uplink signal may include, for example, panel information, information such as a protocol version, a synchronization signal, etc. The active pen 10 may receive the uplink signal and identify the panel information or the protocol version, and may synchronize the signal.

The active pen 10 may transmit a downlink signal to a touch sensor (TS). The touch-driving device 140 may receive the downlink signal through the touch sensor (TS). The downlink signal may include state information of the active pen. The state information of the active pen may include, for example, the position of the active pen, the state of a button of the active pen, the state of a battery of the active pen, the tilt of the active pen, etc.

Parasitic capacitance may be formed between the display electrode and the touch sensor (TS). Such parasitic capacitance may function as an element which hinders the transmission and reception of a signal between the touch sensor (TS) and the active pen 10.

Figure 2:
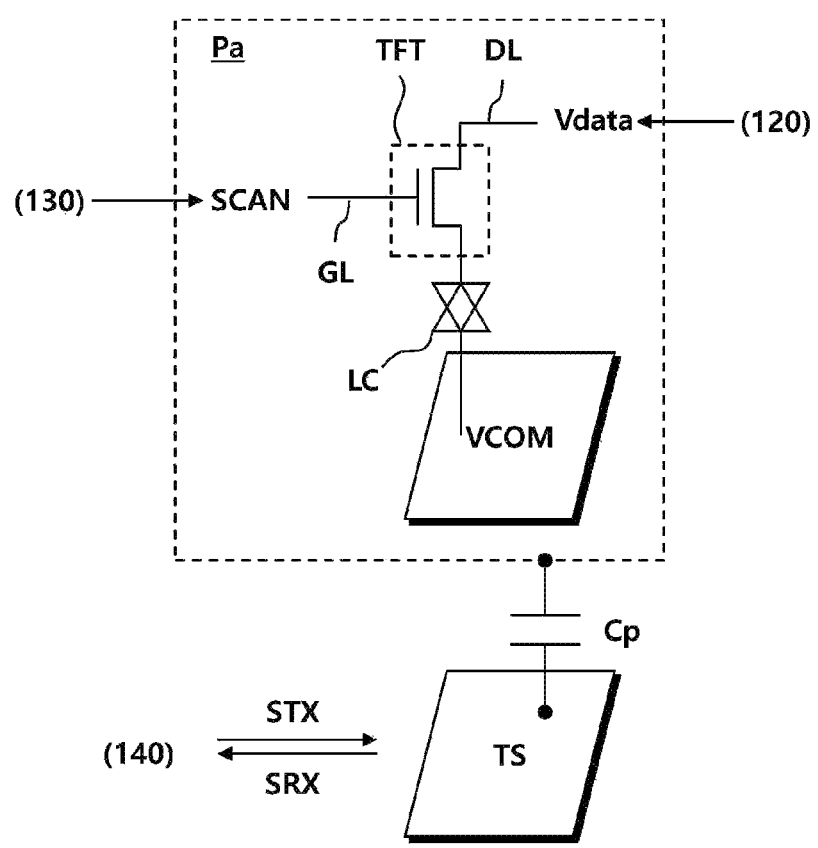
FIG. 2 illustrates parasitic capacitance formed in an LCD panel according to one embodiment.

FIG. 2 illustrates parasitic capacitance formed in an LCD panel according to one embodiment.

Referring to FIG. 2, a pixel (Pa) of the LCD panel may include a transistor (TFT), a liquid crystal (LC), and a common electrode (VCOM).

A gate terminal of the transistor (TFT) may be connected to a gate line (GL), a drain terminal thereof may be connected to a data line (DL), and a source terminal thereof may be connected to the liquid crystal (LC).

When a scan signal (SCAN) corresponding to a turn-on voltage is supplied to the gate terminal through the gate line (GL), the drain terminal and the source terminal of the transistor (TFT) are electrically connected to each other, and a data voltage (Vdata) may be supplied to the liquid crystal (LC). The scan signal (SCAN) may be supplied by the gate-driving device 130 and the data voltage (Vdata) may be supplied by the data-driving device 120.

The common electrode (VCOM) may be supplied with a common voltage. The intensity of a pixel (P) may be adjusted by controlling the liquid crystal (LC) according to the difference between the common voltage and the data voltage (Vdata).

A touch sensor (TS) may be connected to the touch-driving device 140. The touch-driving device 140 may transmit a touch-driving signal (STX) to the touch sensor (TS) and may receive a touch response signal (SRX) from the touch sensor (TS). The touch-driving signal (STX) may include an uplink signal transmitted to an active pen and the touch response signal (SRX) may include a downlink signal received from the active pen.

Parasitic capacitance (Cp) may be formed between the touch sensor (TS) and a display electrode (for example, the data line (DL), the gate line (GL), the common electrode (VCOM), etc.). The magnitude of the parasitic capacitance (Cp) may be different according to the spacing distance from the touch sensor (TS) and the size of each display electrode. In a normal LCD panel, the magnitude of the parasitic capacitance (Cp) may be the largest between a touch sensor (TS) and a common electrode (VCOM).

In an in-cell-type panel, a touch sensor (TS) may be the same as a common electrode (VCOM). In this instance, the parasitic capacitance (Cp) may be formed to be the largest between a common electrode (VCOM) serving as the touch sensor (TS) and another common electrode (VCOM) in the vicinity thereof.

Figure 3:
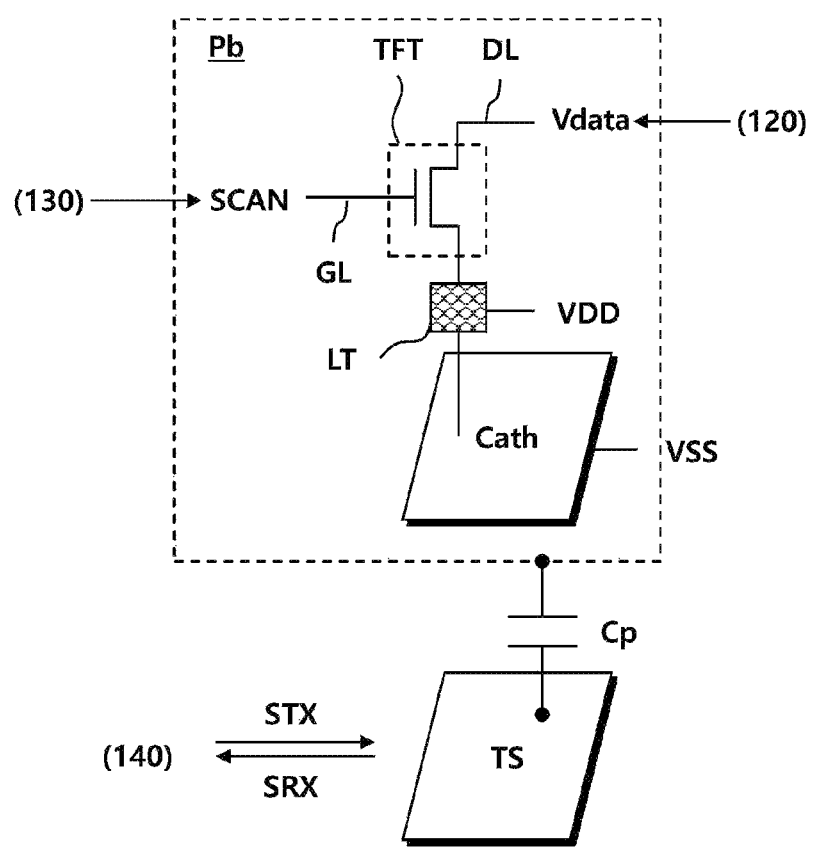
FIG. 3 illustrates parasitic capacitance formed in an OLED panel according to one embodiment.

FIG. 3 illustrates parasitic capacitance formed in an OLED panel according to one embodiment.

Referring to FIG. 3, a pixel (Pb) of the OLED panel may include a transistor (TFT), an OLED structure (LT), and a cathode electrode (Cath).

A gate terminal of the transistor (TFT) may be connected to a gate line (GL), a drain terminal thereof may be connected to a data line (DL), and a source terminal thereof may be connected to the OLED structure (LT).

When a scan signal (SCAN) corresponding to a turn-on voltage is supplied to the gate terminal through the gate line (GL), the drain terminal and the source terminal of the transistor (TFT) are electrically connected to each other, and a data voltage (Vdata) may be supplied to the OLED structure (LT). The scan signal (SCAN) may be supplied by the gate-driving device 130 and the data voltage (Vdata) may be supplied by the data-driving device 120.

The OLED structure (LT) may include a driving transistor (not shown) and an OLED (not shown). The driving transistor (not shown) is supplied with a pixel-driving voltage (VDD), wherein the pixel-driving voltage (VDD) may be transferred to an anode electrode of the OLED (not shown) according to the data voltage (Vdata) supplied to the driving transistor (not shown).

The cathode electrode (Cath) may be supplied with a base voltage (VSS). The intensity of a pixel (P) may be adjusted by controlling the OLED according to the difference between the base voltage (VSS) and the voltage of the anode electrode.

A touch sensor (TS) may be connected to the touch-driving device 140. The touch-driving device 140 may transmit a touch-driving signal (STX) to the touch sensor (TS) and may receive a touch response signal (SRX) from the touch sensor (TS). The touch-driving signal (STX) may include an uplink signal transmitted to an active pen and the touch response signal (SRX) may include a downlink signal received from the active pen.

Parasitic capacitance (Cp) may be formed between the touch sensor (TS) and a display electrode (for example, the data line (DL), the gate line (GL), the cathode electrode (Cath), etc.). The magnitude of the parasitic capacitance (Cp) may be different according to the spacing distance from the touch sensor (TS) and the size of each display electrode. In a normal OLED panel, the parasitic capacitance (Cp) may be the largest between the touch sensor (TS) and the cathode electrode (Cath).

In an in-cell-type panel, a touch sensor (TS) may be the same as a cathode electrode (Cath). In this instance, the parasitic capacitance (Cp) may be formed to be the largest between a cathode electrode (Cath) serving as a touch sensor (TS) and another cathode electrode (Cath) in the vicinity thereof.

A display device according to one embodiment may improve a signal characteristic of an uplink signal by minimizing the effect of parasitic capacitance (Cp) on the transmission of the uplink signal. For example, the display device according to one embodiment may minimize the effect of parasitic capacitance (Cp) by floating a display electrode when an uplink signal is transmitted. As another example, the display device according to one embodiment may minimize the effect of parasitic capacitance (Cp) by supplying a display electrode with a modulation signal, the phase of which is identical to or different by 180 degrees from that of an uplink signal when the uplink signal is transmitted.

Figure 4:
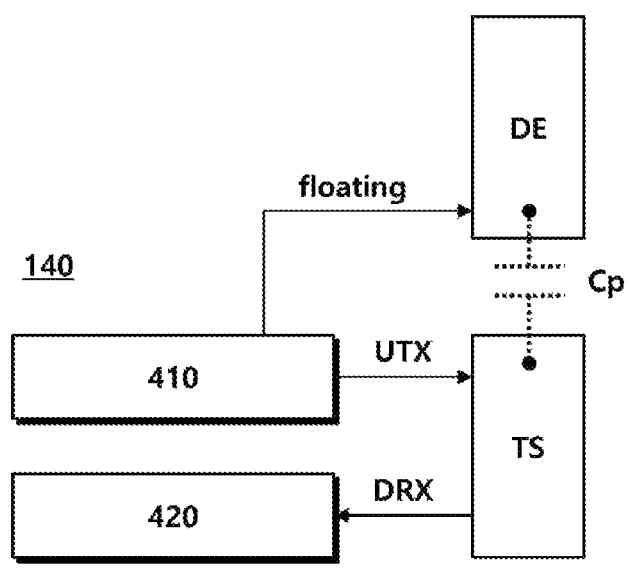
FIG. 4 illustrates the configuration of a touch-driving device according to one embodiment.

FIG. 4 illustrates the configuration of a touch-driving device according to one embodiment.

Referring to FIG. 4, the touch-driving device 140 may include an uplink controlling unit 410 and a downlink controlling unit 420.

The uplink controlling unit 410 may supply an uplink transmission signal (UTX) to a touch sensor (TS) in a first time interval. The uplink controlling unit 410 may float a display electrode (DE), which forms parasitic capacitance (Cp) with the touch sensor (TS) therebetween, in the first time interval. The uplink transmission signal (UTX) is an uplink signal formed in the touch sensor (TS). An uplink signal formed in an active pen may be referred to as an uplink reception signal.

The downlink controlling unit 420 may receive a downlink reception signal (DRX) from the touch sensor (TS) in a second time interval that does not overlap the first time interval. The downlink reception signal (DRX) is a downlink signal from the touch sensor (TS). A downlink signal formed in the active pen may be referral to as a downlink transmission signal.

The touch sensor (TS) may be a common electrode supplied with a common voltage in an LCD panel. In this instance, the display electrode floated by the uplink controlling unit 410 may be, in an LCD panel, a data line supplied with a data voltage or a gate line supplied with a scan signal.

The touch sensor (TS) may be a cathode electrode of an OLED panel. In this instance, the display electrode floated by the uplink controlling unit 410 may be a driving voltage line which supplies a driving voltage to an OLED disposed in each pixel of the OLED panel.

Figure 5:
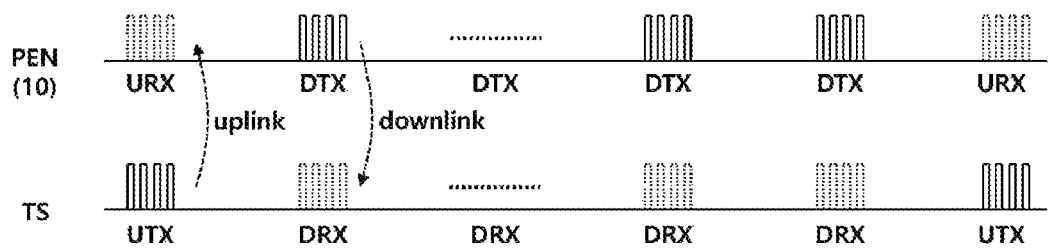
FIG. 5 illustrates the transmission and reception of a signal between a touch sensor and an active pen.

FIG. 5 illustrates the transmission and reception of a signal between a touch sensor and an active pen.

Referring to FIG. 5, a touch sensor (TS) may transmit an uplink transmission signal (UTX) to the active pen 10. The active pen 10 may use an uplink reception signal (URX) formed in the active pen 10 in response to the uplink transmission signal (UTX) to recognize an uplink signal that a touch-driving device transmits to the active pen 10.

The uplink signal may be transmitted only once in a frame in which a display is updated, or may be transmitted two or more times in one frame. The uplink signal may include display panel information or a synchronization signal. The active pen 10 may use the synchronization signal to determine the transmission time point of a downlink signal.

The active pen 10 may transmit a downlink transmission signal (DTX) to the touch sensor (TS). The touch-driving device may recognize a downlink signal by using a downlink reception signal (DRX) formed in the touch sensor (TS) in response to the downlink transmission signal (DTX).

The downlink signal may be transmitted multiple times in a frame in which the display is updated. Through the downlink signal, the touch-driving device may recognize the position of the active pen 10, the pressure at which the active pen 10 presses the touch sensor (TS), the pressed state of a button attached to the active pen 10, the remaining battery capacity of the active pen 10, the tilt of the active pen 10, etc.

As described above, when an uplink signal is transmitted, the characteristics of the uplink signal may be degraded by parasitic capacitance formed in a panel. The display device according to one embodiment may minimize the effect of parasitic capacitance by floating a display electrode when the uplink signal is transmitted.

Figure 6:
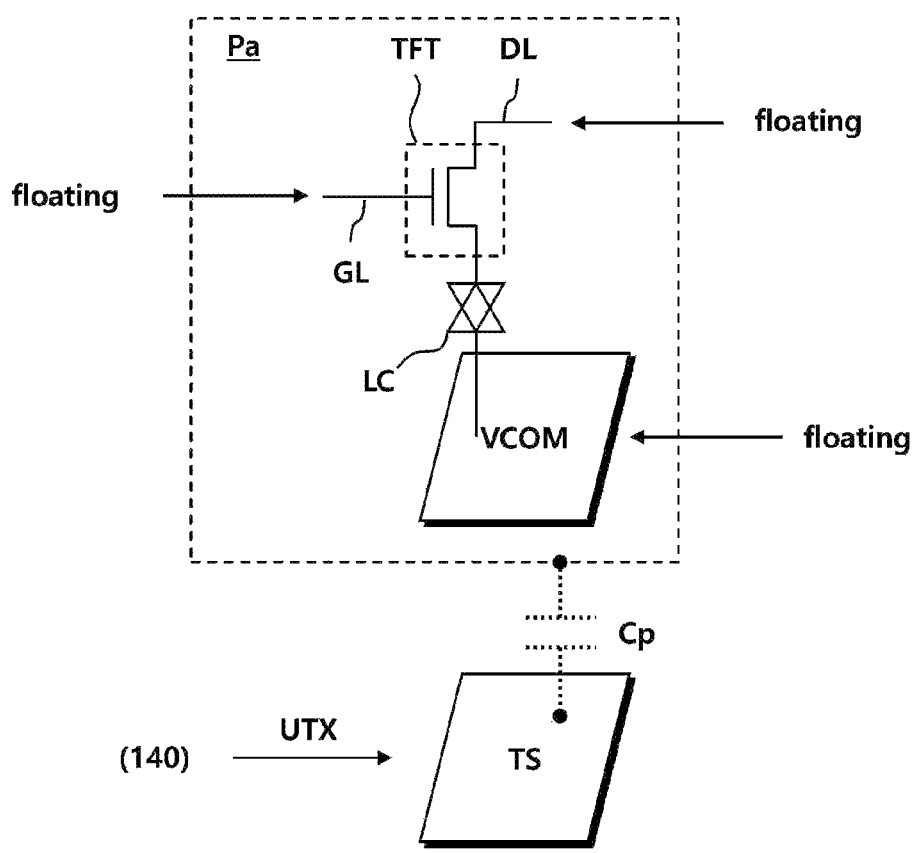
FIG. 6 illustrates an operation in which a display electrode is floated to minimize the effect of parasitic capacitance according to one embodiment.

FIG. 6 illustrates minimizing the effect of parasitic capacitance by floating a display electrode according to one embodiment.

Referring to FIG. 6, when the touch-driving device 140 transmits an uplink transmission signal (UTX) to a touch sensor (TS), the display device may float a display electrode. The display electrode may be, for example, a gate line (GL), a data line (DL), a common electrode (VCOM), etc. Alternatively, the display electrode may be, for example, a gate line (GL), a data line (DL), a cathode electrode, a driving voltage line, etc.

When a display electrode coupled to the touch sensor (TS) through parasitic capacitance (Cp) is floated, an electric charge does not move from the touch sensor (TS) to the display electrode via the parasitic capacitance (Cp). When the uplink transmission signal (UTX) is transmitted to the touch sensor (TS), the movement of a part of an electric charge supplied as the uplink transmission signal (UTX) to the parasitic capacitance (Cp) may become problematic. As in one embodiment, if the display electrode is floated such that the electric charge does not move to the parasitic capacitance (Cp), the above-mentioned problem may be minimized.

When a touch sensor (TS) and common electrodes are separately arranged, the common electrodes are electrically connected to each other in the entire panel, and may be connected to a common voltage supply device through one line. The common voltage supply device may block a common voltage supplied to each of the common electrodes in accordance with a time point of transmission of an uplink signal (for example, may block a line for supplying a common voltage) and float the common electrode.

When a touch sensor (TS) and cathode electrodes are separately arranged, the cathode electrodes are electrically connected to each other in the entire panel, and may be connected to a base voltage supply device through one line. The base voltage supply device may block a base voltage supplied to each of the cathode electrodes in accordance with the time point of transmission of an uplink signal (for example, may block a line for supplying a base voltage) and float the cathode electrode.

The display device may transmit an uplink signal to the touch sensor (TS) in the time interval in which a display-driving voltage is not supplied to the display electrode, and may float the display electrode.

Figure 7:
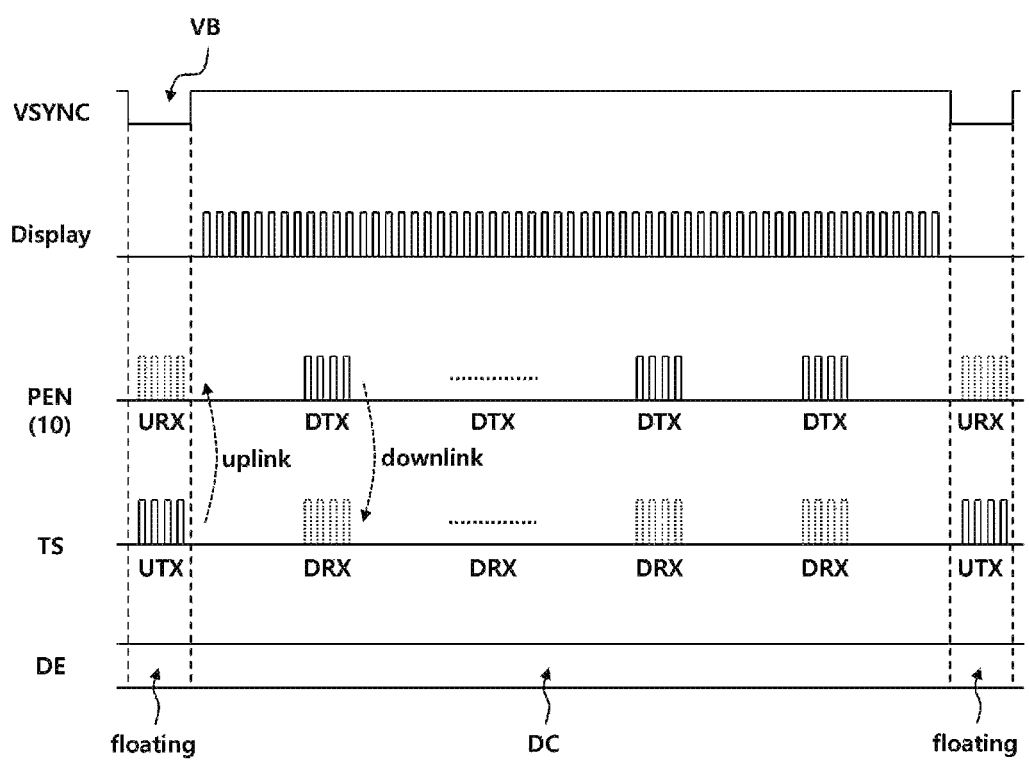
FIG. 7 illustrates an operation in which a touch-driving device transmits an uplink signal and floats a display electrode in a VBlank time interval according to one embodiment.

FIG. 7 illustrates an operation in which, in a VBlank time interval, a touch-driving device transmits an uplink signal and float a display electrode according to one embodiment.

Referring to FIG. 7, the touch-driving device may transmit an uplink signal to a touch sensor (TS) in a VBlank (VB) time interval indicated by a vertical synchronization signal (VSYNC). A display electrode (DE) may be floated in the VBlank (VB) time interval. The VBlank (VB) time interval is the time interval in which a display is not updated, and the display device may update the display in a time interval other than the VBlank (VB) in a frame in which the display is updated.

The updating of the display and the transmission/reception of a downlink signal may be performed together. When the display electrode floated in the VBlank (VB) time interval is a common electrode or a cathode electrode, the display electrode may be supplied with a direct-current voltage (for example, a common voltage, a base voltage, etc.) in the time interval in which the display is updated.

Figure 8:
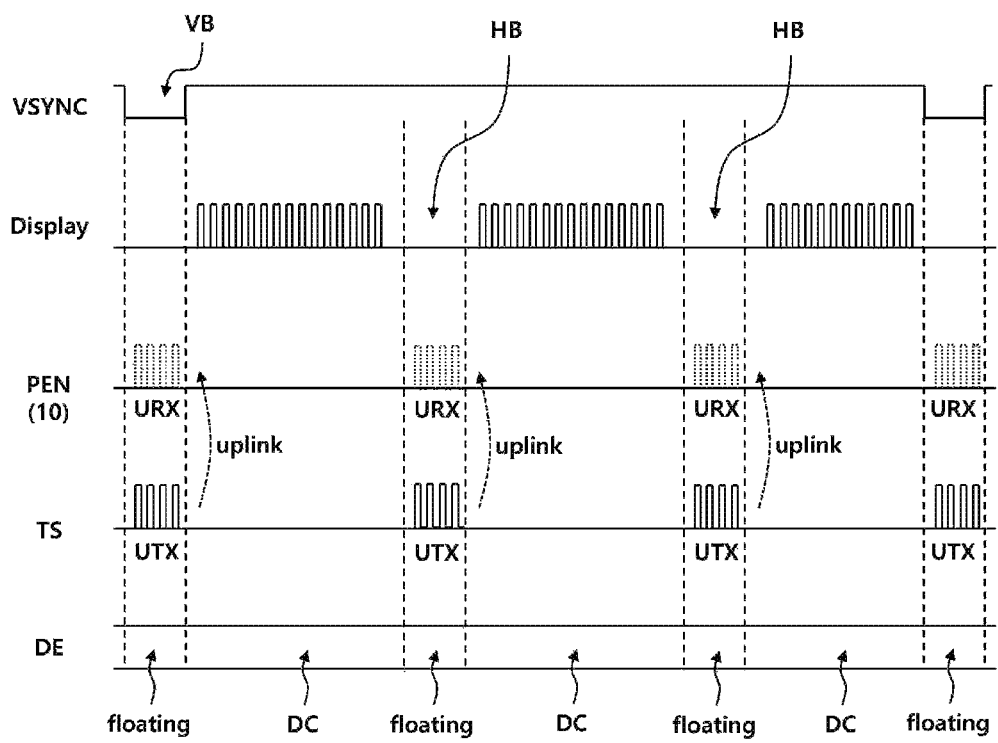
FIG. 8 illustrates an operation in which a touch-driving device transmits an uplink signal and floats a display electrode in VBlank and HBlank time intervals according to one embodiment.

FIG. 8 illustrates an operation in which, in VBlank and HBlank time intervals, a touch-driving device transmits an uplink signal and floats a display electrode according to one embodiment.

Referring to FIG. 8, the touch-driving device may transmit an uplink signal to a touch sensor (TS) in a VBlank (VB) time interval indicated by vertical synchronization signal (VSYNC) and in a HBlank (HB) time interval indicated by a horizontal synchronization signal (HSYNC, not shown). A display electrode (DE) may be floated in the VBlank (VB) time interval and in the HBlank (HB) time interval. The VBlank (VB) time interval and the HBlank (HB) time interval are time intervals in which a display is not updated. The VBlank (VB) time interval appears once in one frame in which all pixels are updated, and the HBlank (HB) time interval may appear whenever a line of pixels is updated.

The display device may update the display in a time interval other than the VBlank (VB) time interval and the HBlank (HB) time interval. A downlink signal may also be transmitted and received in the time interval in which the display is updated.

The display device may transmit a modulation signal to the display electrode in the time interval in which the uplink signal is transmitted and received.

Figure 9:
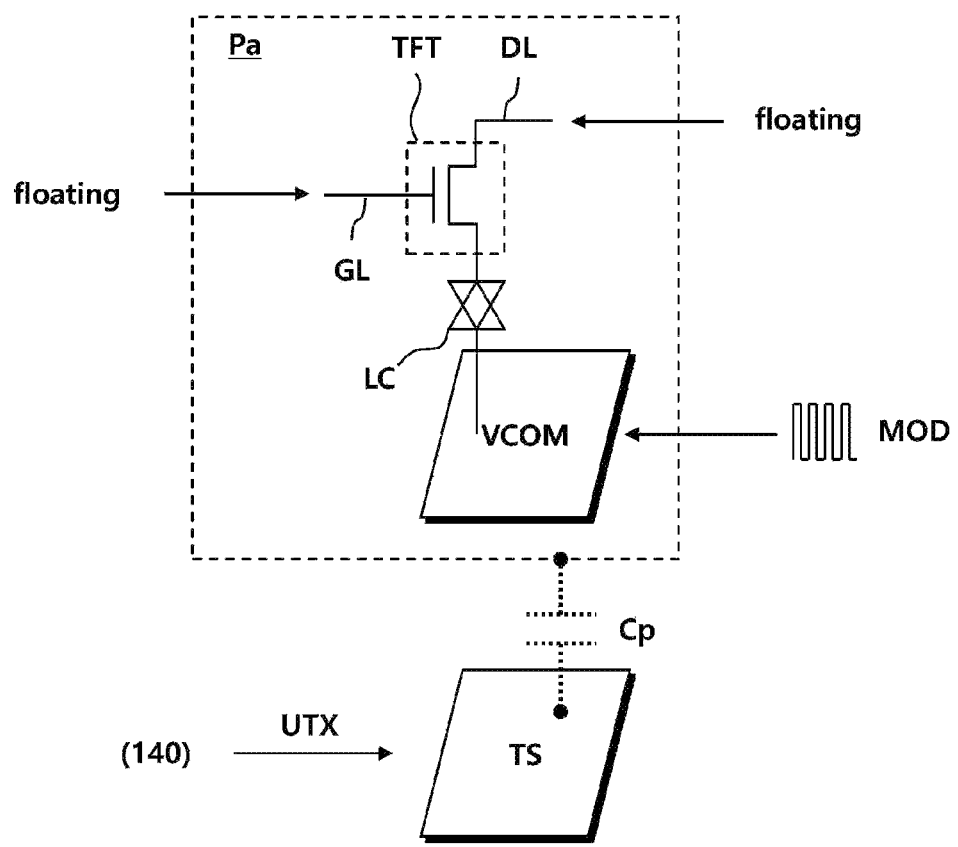
FIG. 9 illustrates the supply of a modulation signal to a display electrode to minimize the effect of parasitic capacitance according to one embodiment.

FIG. 9 illustrates the supply of a modulation signal to a display electrode to minimize the effect of parasitic capacitance according to one embodiment.

Referring to FIG. 9, when the touch-driving device 140 transmits an uplink transmission signal (UTX) to a touch sensor (TS), the display device may transmit a modulation signal (MOD) to a display electrode.

The modulation signal (MOD) may be a signal identical in phase to an uplink signal. The modulation signal (MOD) may be generated in a source identical to that of the uplink signal, or may be generated in a separate source. The modulation signal (MOD) may be identical in phase to the uplink signal but may be different in voltage level from the uplink signal.

When the same signal is supplied to the touch sensor (TS) and the display electrode (DE), which are coupled to each other by parasitic capacitance (Cp), an electric charge may not move to the parasitic capacitance (Cp). When signals that are not identical but have the same phase are supplied to the touch sensor (TS) and the display electrode (DE), the amount of electric charge moving to the parasitic capacitance (Cp) may decrease.

When the electric charge does not move to the parasitic capacitance (Cp) or the amount of the electric charge moving to the parasitic capacitance (Cp) decreases, the effect of the parasitic capacitance (Cp) on the uplink transmission signal (UTX) may be minimized.

The display device may supply a modulation signal (MOD) to one display electrode and may float another display electrode. For example, the display device may supply a modulation signal (MOD) to the common electrode or cathode electrode and may float a gate line and a data line.

Figure 10:
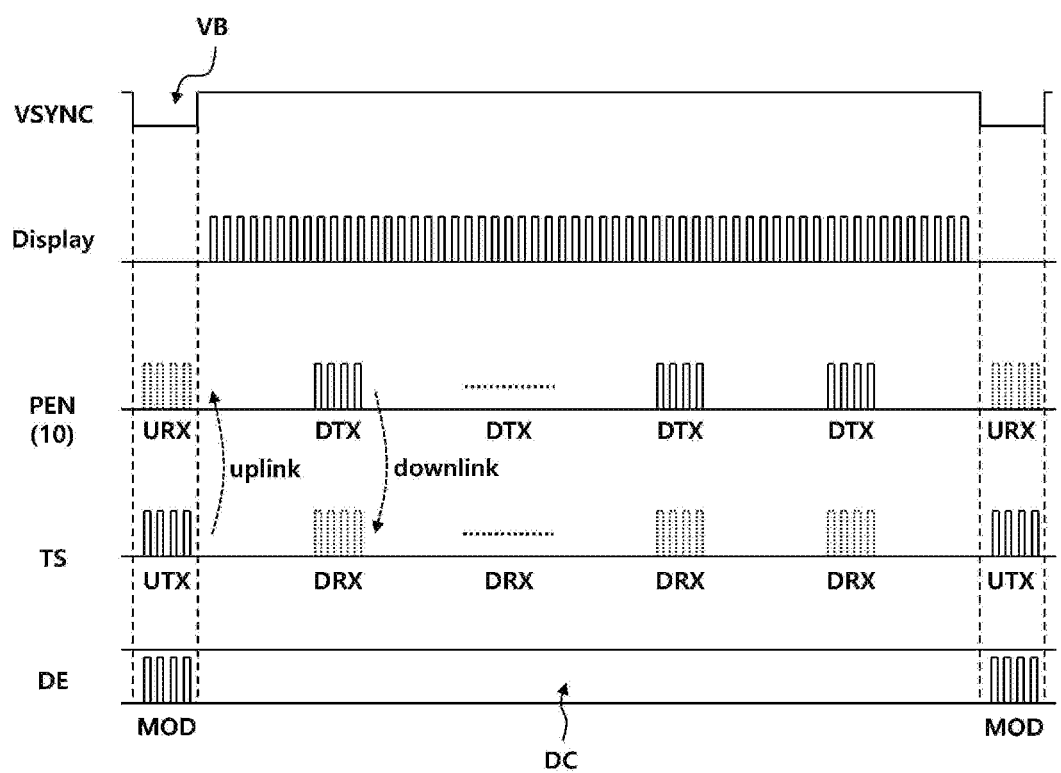
FIG. 10 illustrates an operation in which a touch-driving device transmits an uplink signal and floats a display electrode in a VBlank time interval according to one embodiment.
Figure 11:
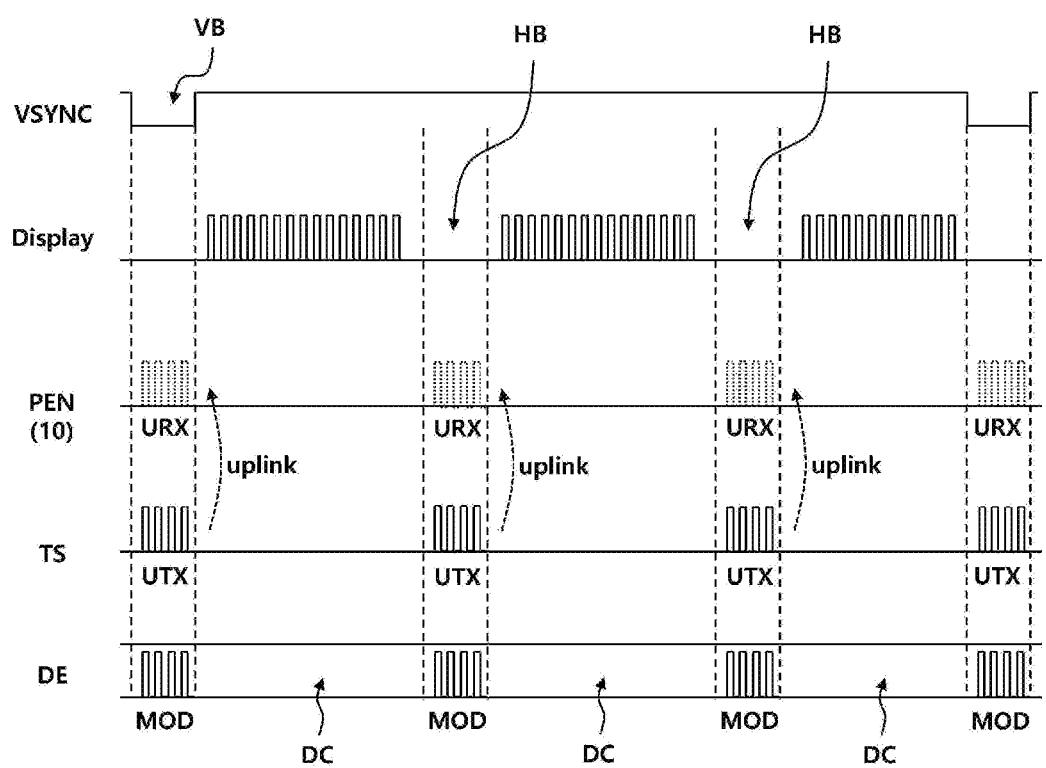
FIG. 11 illustrates an operation in which a touch-driving device transmits an uplink signal and floats a display electrode in VBlank and HBlank time intervals according to one embodiment.

FIG. 10 illustrates an operation in which, in a VBlank time interval, a touch-driving device transmits an uplink signal and floats a display electrode according to one embodiment. FIG. 11 illustrates an operation in which, in VBlank and HBlank time intervals, a touch-driving device transmits an uplink signal and floats a display electrode according to one embodiment.

Referring to FIGS. 10 and 11, the touch-driving device may transmit an uplink signal to a touch sensor (TS) in a VBlank (VB) time interval indicated by a vertical synchronization signal (VSYNC) and/or in a HBlank (HB) time interval indicated by a horizontal synchronization signal (HSYNC, not shown). The display device may transmit a modulation signal (MOD) to a display electrode (DE) in the VBlank (VB) time interval and/or in the HBlank (HB) time interval.

When a panel is an OLED panel, a display may not be updated even at the time at which the display device senses the characteristics of a pixel. In a time interval in which the characteristics of the pixel are sensed, the display device may transmit an uplink signal and may float the display electrode (DE) or transmit a modulation signal (MOD) to the display electrode (DE).

The modulation signal (MOD) may have a waveform identical to or different from that of the uplink signal. The modulation signal (MOD) may have a square, trapezoidal, sine, or triangular waveform.

The uplink signal may have a signal level (voltage level) identical to that of the downlink signal. Depending on the embodiments, the signal level of the uplink signal may be maintained higher than that of the downlink signal. In this instance, the characteristics of the uplink signal may be further improved.

Figure 12:
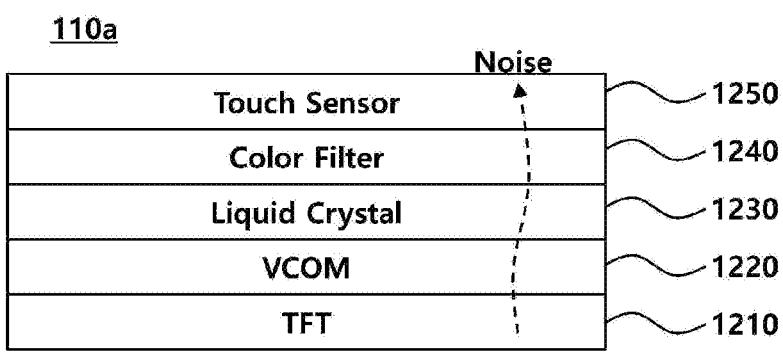
FIG. 12 illustrates the configuration of one example in which a panel is configured as an LCD panel according to one embodiment.

FIG. 12 illustrates the configuration of one example in which a panel is configured as an LCD panel according to one embodiment.

Referring to FIG. 12, a panel 110a may include a thin-film-transistor (TFT) substrate 1210, a common electrode layer 1220, a liquid crystal layer 1230, a color filter layer 1240, and a touch sensor layer 1250.

A transistor and a pixel electrode, which are arranged in a pixel, may be arranged on the TFT substrate 1210, and a common electrode may be arranged on the common electrode layer 1220. The TFT substrate 1210 and the common electrode layer 1220 together may be referral to as a display electrode layer.

A display electrode (for example, a gate line, a data line, a common electrode, etc.) may be arranged on the display electrode layer. A display-driving voltage supplied to the display electrode may be recognized as noise by the touch sensor layer 1250. The liquid crystal layer 1230 and/or the color filter layer 1240 may be interposed between the display electrode layer and the touch sensor layer 1250. Due to the liquid crystal layer 1230 and/or the color filter layer 1240, parasitic capacitance may be formed between the display electrode and a touch sensor.

An uplink signal generated by the touch-driving device may be affected by the noise and the parasitic capacitance. The display device according to one embodiment may minimize the above-mentioned effect of the noise by transmitting an uplink signal in a time interval in which the display-driving voltage is not supplied to the display electrode. When transmitting the uplink signal, the display device according to one embodiment may minimize the above-mentioned effect of parasitic capacitance by floating the display electrode or supplying a modulation signal to the display electrode.

Figure 13:
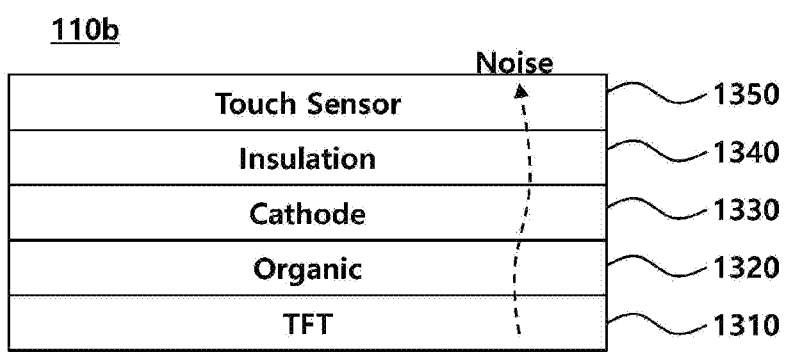
FIG. 13 illustrates the configuration of one example in which a panel is configured as an OLED panel according to one embodiment

FIG. 13 illustrates the configuration of one example in which a panel is configured as an OLED panel according to one embodiment.

Referring to FIG. 13, a panel 110b may include a TFT substrate 1310, an organic light-emitting material layer 1320, a cathode electrode layer 1330, an insulation layer 1340, and a touch sensor layer 1350.

A transistor and an anode electrode, which are arranged in a pixel, may be arranged on the TFT substrate 1310, and an organic light-emitting material, which emits light by using electric energy, may be arranged in the organic light-emitting material layer 1320. The cathode electrode layer 1330 may have a cathode electrode arranged to supply a base voltage to an OLED. The TFT substrate 1310, the organic light-emitting material layer 1320, and the cathode electrode layer 1330 together may be referred to as a display electrode layer.

A display electrode (for example, a gate line, a data line, an anode electrode, a cathode electrode, etc.) may be arranged on the display electrode layer. A display-driving voltage supplied to the display electrode may be recognized as noise by the touch sensor layer 1350. The insulation layer 1340 may be interposed between the display electrode layer and the touch sensor layer 1350. Due to the insulation layer 1340, parasitic capacitance may be formed between the display electrode and a touch sensor.

An uplink signal generated by the touch-driving device may be affected by the noise and the parasitic capacitance. The display device according to one embodiment may minimize the above-mentioned effect of the noise by transmitting an uplink signal in a time interval in which the display-driving voltage is not supplied to the display electrode. When transmitting the uplink signal, the display device according to one embodiment may minimize the above-mentioned effect of the parasitic capacitance by floating the display electrode or supplying a modulation signal to the display electrode.

As described above, according to the present embodiment, the characteristics of an uplink signal transmitted to an active pen may be improved without increasing power consumption.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although a preferred embodiment of the present disclosure has been described for illustrative purposes, those skilled in the art will appreciate that various modifications, additions and substitutions are possible, without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device comprising:
    a display electrode layer on which display electrodes are disposed;
    a touch sensor layer on which touch sensors are disposed;
    a display-driving device configured to supply a display-driving voltage to the display electrode; and
    a touch-driving device configured to transmit an uplink signal to a touch pen and receive a downlink signal from the touch pen, through the touch sensor,
    wherein a parasitic capacitance is formed between the display electrode and the touch sensor, and when the touch-driving device transmits the uplink signal, the display electrode is supplied with a modulation signal identical in phase to the uplink signal.

2. The display device of claim 1, wherein the display electrode is a cathode electrode of an organic light-emitting diode (OLED) panel, and when the uplink signal is transmitted, the modulation signal is supplied to a data line or gate line of the OLED panel.

3. The display device of claim 1, wherein the modulation signal has a square, trapezoidal, sine, or triangular waveform.

4. The display device of claim 1, wherein the display electrode is a cathode electrode of an organic light-emitting diode (OLED), and an insulation film is interposed between the display electrodes and the touch sensors.

5. A touch-driving device configured to transmit an uplink signal to a touch pen and receive a downlink signal from the touch pen, the touch-driving device comprising:
    an uplink controlling unit configured to transmit the uplink signal through a touch sensor while supplying a modulation signal identical in phase to the uplink signal to a display electrode, which forms a parasitic capacitance with the touch sensor therebetween, in a first time interval; and
    a downlink controlling unit configured to receive the downlink signal through the touch sensor in a second time interval which does not overlap the first time interval.

6. The touch-driving device of claim 5, wherein the first time interval is included in a time interval in which a display is not updated.

7. The touch-driving device of claim 5, wherein the touch sensor is a cathode electrode of an organic light-emitting diode (OLED) panel, and the display electrode is a driving voltage line configured to supply a driving voltage to an OLED disposed in each pixel of the OLED panel.

* * * * *